United States Patent
Masputra et al.

(10) Patent No.: US 7,532,644 B1
(45) Date of Patent: May 12, 2009

(54) METHOD AND SYSTEM FOR ASSOCIATING MULTIPLE PAYLOAD BUFFERS WITH MULTIDATA MESSAGE

(75) Inventors: Cahya A. Masputra, Millbrae, CA (US); Hsiao-Keng Jerry Chu, Palo Alto, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 621 days.

(21) Appl. No.: 11/044,382

(22) Filed: Jan. 26, 2005

Related U.S. Application Data (63) Continuation-in-part of application No. 10/170,919, filed on Jun. 12, 2002, now abandoned.

(51) Int. Cl.
  *H04J 3/16* (2006.01)
  *H04L 12/54* (2006.01)
  *H04L 12/56* (2006.01)

(52) U.S. Cl. .................... 370/469; 370/428; 370/395.5; 709/227; 709/237

(58) Field of Classification Search .............. 370/469, 370/428; 709/227, 237
See application file for complete search history.

(56) References Cited

U.S. PATENT DOCUMENTS

| | | | | |
|---|---|---|---|---|
| 5,515,538 A | * | 5/1996 | Kleiman | 710/260 |
| 5,860,149 A | * | 1/1999 | Fiacco et al. | 711/209 |
| 6,341,198 B1 | * | 1/2002 | Mendenhall et al. | 386/98 |
| 6,405,237 B1 | * | 6/2002 | Khalidi et al. | 709/203 |
| 6,813,701 B1 | * | 11/2004 | Ansari | 712/4 |
| 6,906,980 B2 | * | 6/2005 | Kuo et al. | 365/230.03 |
| 7,298,746 B1 | * | 11/2007 | De La Iglesia et al. | 370/394 |

* cited by examiner

*Primary Examiner*—Edan Orgad
*Assistant Examiner*—Blanche Wong
(74) *Attorney, Agent, or Firm*—Martine Penilla & Gencarella, LLP (57) ABSTRACT

A multidata framework is provided to allow multiple payload buffers to be associated with a single multidata message. In the multidata framework of the present invention, a number of payload buffers are associated with the multidata following allocation of the multidata header buffer. The number of payload buffers can reside at disjoint virtual address locations in memory. Each payload buffer is assigned an index for identification purposes. A number of packets are defined to represent the multidata message. Each packet includes a header portion and a payload portion. The payload portion is defined as a set of payload spans. Each payload span is mapped to the payload portion of the appropriate packet by an appropriate payload buffer index and address range in the appropriate payload buffer. Thus, a packet's payload portion can include payload spans that are located at disjoint virtual address location in memory.

20 Claims, 8 Drawing Sheets

METHOD AND SYSTEM FOR ASSOCIATING MULTIPLE PAYLOAD BUFFERS WITH MULTIDATA MESSAGE

CROSS REFERENCE TO RELATED APPLICATIONS

This application is a continuation-in-part (CIP) of prior U.S. application Ser. No. 10/170,919, filed Jun. 12, 2002, the disclosure of which is incorporated herein by reference. This application is also related to prior U.S. application Ser. No. 10/170,839, filed Jun. 12, 2002, the disclosure of which is incorporated herein by reference.

BACKGROUND

As the bandwidth of networking systems continues to increase, a desire to perform bulk-data transfer operations also increases. However, in traditional networking systems, the underlying operating system typically has a limited capability for efficiently handling bulk-data transfer operations. For example, a traditional paradigm of networking systems has been to provide a network throughput that is correlated to an underlying host processor speed, e.g., 1 megabit per second (Mbps) network throughput per 1 megahertz (MHz) of processor speed. Although such paradigms may have been sufficient in the past for low-bandwidth network environments, they are not adequate for current high-bandwidth network environments, wherein bandwidths can be specified in units of gigabit per second (Gbps). Such high-bandwidth network environments create a tremendous overhead processing cost for the traditional networking systems.

In view of the foregoing, a need continually exists for improvements in technology associated with networking system design/implementation such that high-bandwidth networking capability can be more fully utilized, particularly when performing bulk-data transfer operations.

SUMMARY

It should be appreciated that the present invention can be implemented in numerous ways, such as a process, an apparatus, a system, a device or a method. Several inventive embodiments of the present invention are described below.

In one embodiment, a method for generating a multidata message for transmission from a computer operating kernel to a network device driver is disclosed. The method includes allocating a header buffer to store header data for one or more packets required to define the multidata message. A number of payload buffers are also allocated as necessary to accommodate application data to be processed. In one embodiment, the payload buffers are allocated at disjoint virtual address locations in memory. The method further includes processing the application data into the number of payload buffers. Additionally, the method includes generating packet information for each of the one or more packets. The packet information identifies a header in the header buffer corresponding to the packet and a payload description for the packet. The payload description identifies a number of payload spans, wherein the number of payload spans reside in multiple payload buffers. The generated packet information is used to assemble each of the one or more packets during transmission of the multidata message.

In another embodiment, a computer readable media including program instructions for generating a multidata message for transmission from a computer operating kernel to a network device driver is disclosed. The computer readable media includes program instructions for allocating a header buffer to store header data for one or more packets required to define the multidata message. Program instructions are also provided for allocating a number of payload buffers as necessary to accommodate application data to be processed. In one embodiment, the payload buffers are allocated at disjoint virtual address locations in memory. Program instructions are further provided for processing the application data into the number of payload buffers. Additionally, the computer readable media includes program instructions for generating packet information for each of the one or more packets. The packet information identifies a header in the header buffer corresponding to the packet and a payload description for the packet. The payload description identifies a number of payload spans, wherein the number of payload spans reside in multiple payload buffers. Program instructions are also provided for using the generated packet information to assemble each of the one or more packets during transmission of the multidata message.

In another embodiment, a computer system is disclosed. The computer system includes a memory, a processor, a network interface device, and kernel memory allocated within the memory. The processor is defined to communicate with the memory. The network interface device is defined to communicate with the memory and the processor. The kernel memory includes data that defines a multidata transmission module. The multidata transmission module includes logic to direct generation and transmission of a multidata message through the network interface device, wherein the multidata message is associated with multiple payload buffers.

Other aspects of the invention will become apparent from the following detailed description, taken in conjunction with the accompanying drawings, illustrating by way of example the principles of the invention.

DETAILED DESCRIPTION

In the following description, numerous specific details are set forth in order to provide a thorough understanding of the present invention. It will be apparent, however, to one skilled in the art that the present invention may be practiced without some or all of these specific details. In other instances, well known process operations have not been described in detail in order not to unnecessarily obscure the present invention.

It should be appreciated that the present invention can be implemented in numerous ways, including as a process, an apparatus, a system, a device, or a method. Several exemplary embodiments of the invention will now be described in detail with reference to the accompanying drawings.

The present invention represents an enhancement of the invention disclosed in co-pending U.S. patent application Ser. No. 10/170,919, entitled "System and Method for a Multidata Network Layer Transmit Interface." As previously indicated, the above-mentioned patent application is incorporated herein by reference. However, to facilitate description of the present invention, a first portion (Part 1) of the detailed description to follow includes a discussion of the invention disclosed in the above-mentioned co-pending patent application. Then, a second portion (Part 2) of the detailed description to follow includes a description of the present invention.

Part 1: Multidata Interface

A multi-packet data transmission optimization system provides a programmer the ability to dynamically transmit multiple packets of application program data in a single bulk transmission from a computer application program over a computer network to a host device. The multi-packet data transmission optimization system can be implemented in a transport layer of an operating system kernel.

Figure 1:
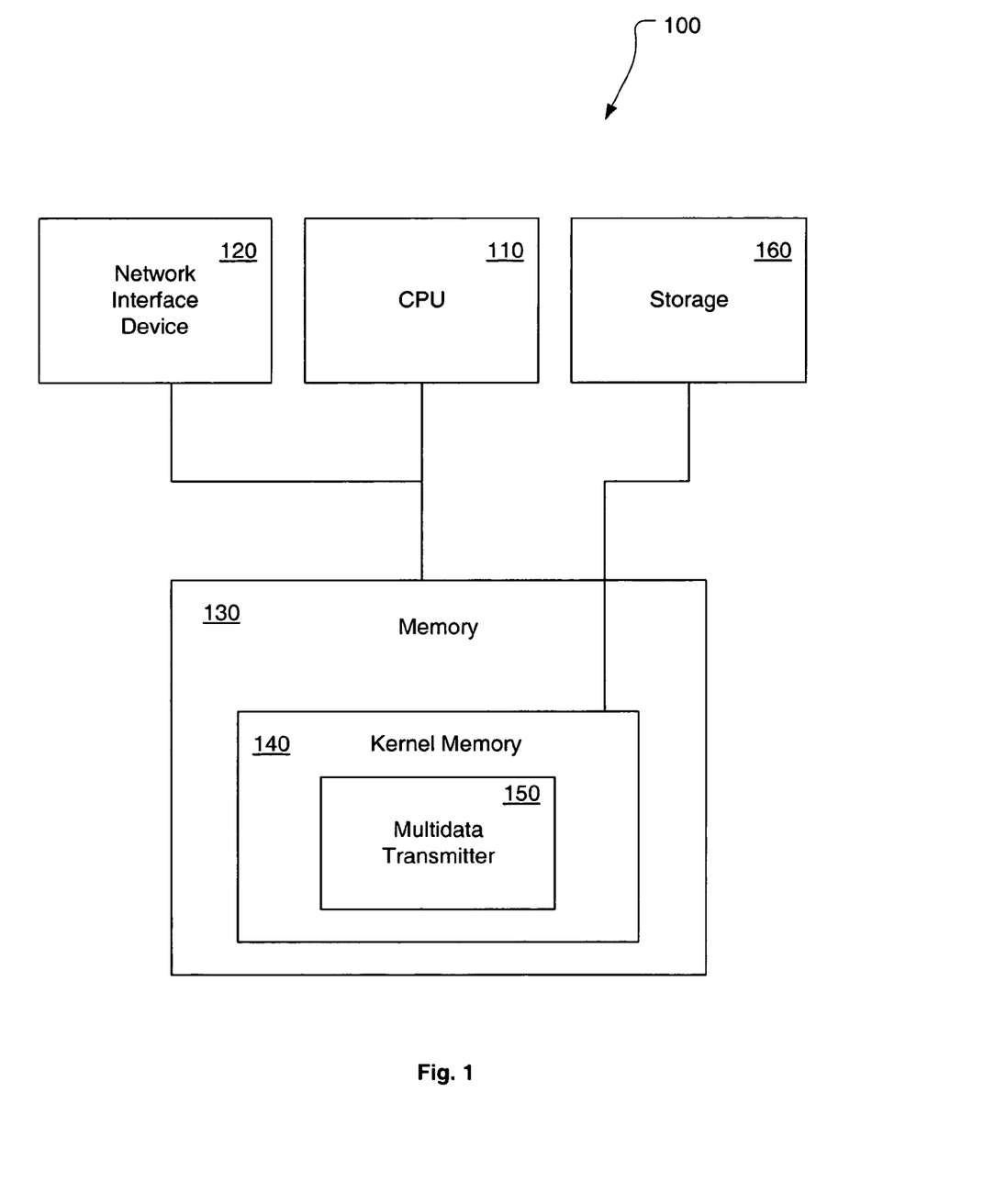
FIG. 1 is an illustration showing a block diagram a computer system, in accordance with one embodiment of the present invention.

FIG. 1 is an illustration showing a block diagram a computer system 100, in accordance with one embodiment of the present invention. Components of the computer system 100 include a processor 110, a memory 130, a storage device 160, and a network interface device 120. The processor 110, storage device 160, and network interface device 120 are connected to communicate through respective bus lines with the memory 130. It should be appreciated that the memory 130 can be virtual memory which is mapped onto physical memory, e.g., RAM or hard drive. A portion of the memory 130 is shown to be allocated as a kernel memory 140. During process execution, data structures may be programmed in the kernel memory 140. A portion of the kernel memory 140 is shown to include a multidata transmission module (MDT) 150. The MDT 150 enables a programmer to optimize data packet flow through a transport layer of a network subsystem of a kernel as defined in the kernel memory 140.

Figure 2:
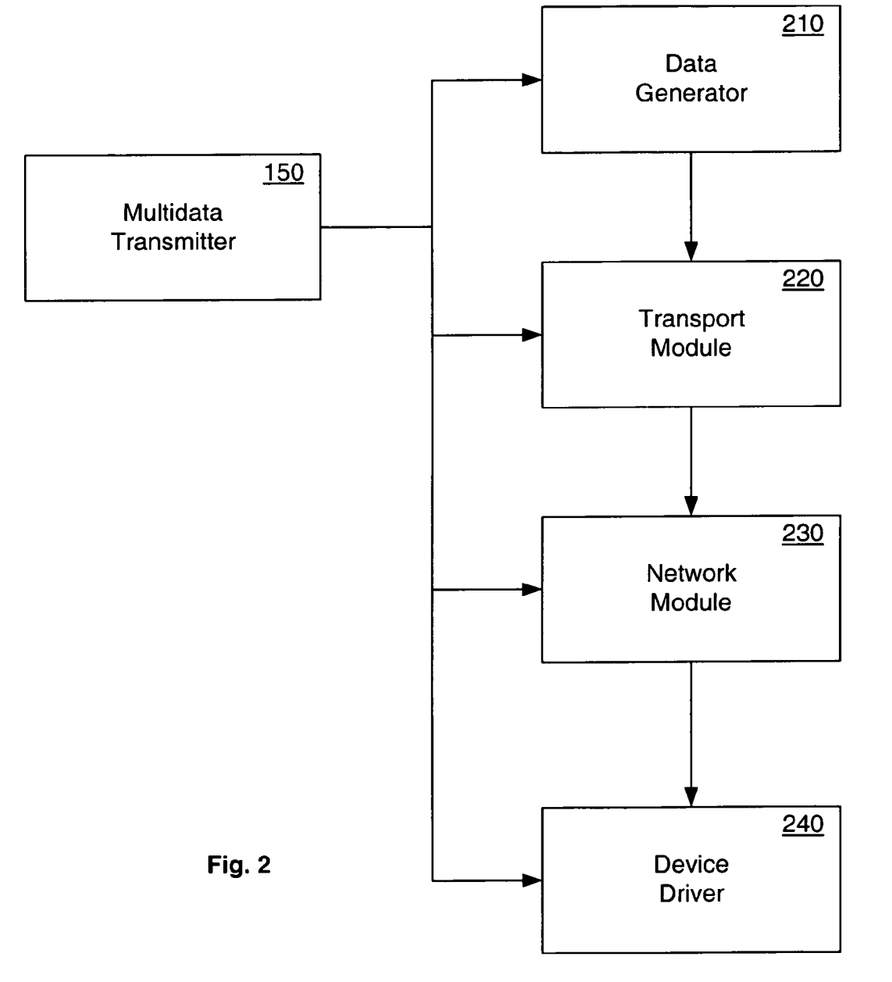
FIG. 2 is an illustration showing an exemplary block diagram of the network subsystem of the kernel, in accordance with one embodiment of the present invention.

FIG. 2 is an illustration showing an exemplary block diagram of the network subsystem of the kernel, in accordance with one embodiment of the present invention. In addition to the MDT 150, as previously mentioned, the exemplary kernel memory 140 further includes kernel data generation module 210, transport module 220, network module 230, and device driver 240. The data generation module 210 provides a STREAM configuration for the present invention. More specifically, in response to a multidata transmit request from the transport module 220, the data generation module 210 is defined to generate multiple segments of data representing a single block of application data.

The transport module 220 functions to optimize a performance of a main data path for an established connection associated with a particular application program. The optimization provided by the transport module 220 is achieved in part by the network module 230 knowledge of the transport module 220, which permits the network module 230 to deliver inbound data blocks to the correct transport instance and to compute checksums on behalf of the transport module 220. Additionally, the transport module 220 includes logic that enables it to substantially reduce an amount of acknowledgment overhead in each data block processed through the network subsystem. In one embodiment, the transport module 220 creates a single, consolidated transport/network header set for multiple outgoing packets before sending the packets to the network module 230.

The network module 230 is defined to function as a packet forwarder. The main data path through the network module 230 is optimized for both inbound and outbound data blocks. For example, the network module 230 is optimized to acknowledge and fully resolve addresses to ports that have been registered with the network module 230 by transport layer protocols. Additionally, the network module 230 computes checksums for inbound data blocks transmitted through the network subsystem. The checksums computed by the network module 230 include not only the network header checksums, but also transport-related checksums. In one embodiment, the network module 230 knows enough about the transport module 220 headers to access the checksum fields in the transport module 220 headers. Also, the transport module 220 initializes headers in such a way that the network module 230 can efficiently compute the checksums.

The multidata transmission module 150 provides an extensible, packet-oriented, and protocol-independent mechanism for reducing the per-packet transmission overhead associated with the transmission of large chunks of data through the kernel network subsystem. In general, the MDT 150 enables the underlying network device driver 240 to amortize input/output memory management unit (IOMMU) related overhead across a number of data packets transmitted through the kernel network subsystem.

In the multidata framework of Part 1 of the present description, the MDT 150 and kernel networking subsystem enables the necessary IOMMU operations to be performed on just two contiguous blocks of memory during each transmit call to the transport module 220, wherein the two contiguous blocks of memory represent a header buffer and a data payload buffer. Therefore, per-packet transmission overhead is reduced because the device driver is only required to perform the necessary IOMMU operations on two contiguous blocks of memory representing the header data and the payload data, wherein the payload data corresponds to multiple packets of data within the payload buffer.

The MDT 150 instructs the data generation module 210 to copy larger chunks of the application data into the kernel memory 140. In one embodiment, the MDT 150 avoids having dependencies on the underlying network hardware or firmware. The MDT 150 further avoids changing the data generation framework of the data generation module 210, thus minimizing a potential impact on stability and performance of the underlying operating system. Therefore, the MDT 150 provides a mechanism to increase network application throughput and achieve a better utilization of the host processor without requiring modification of the underlying operating system.

Figure 3:
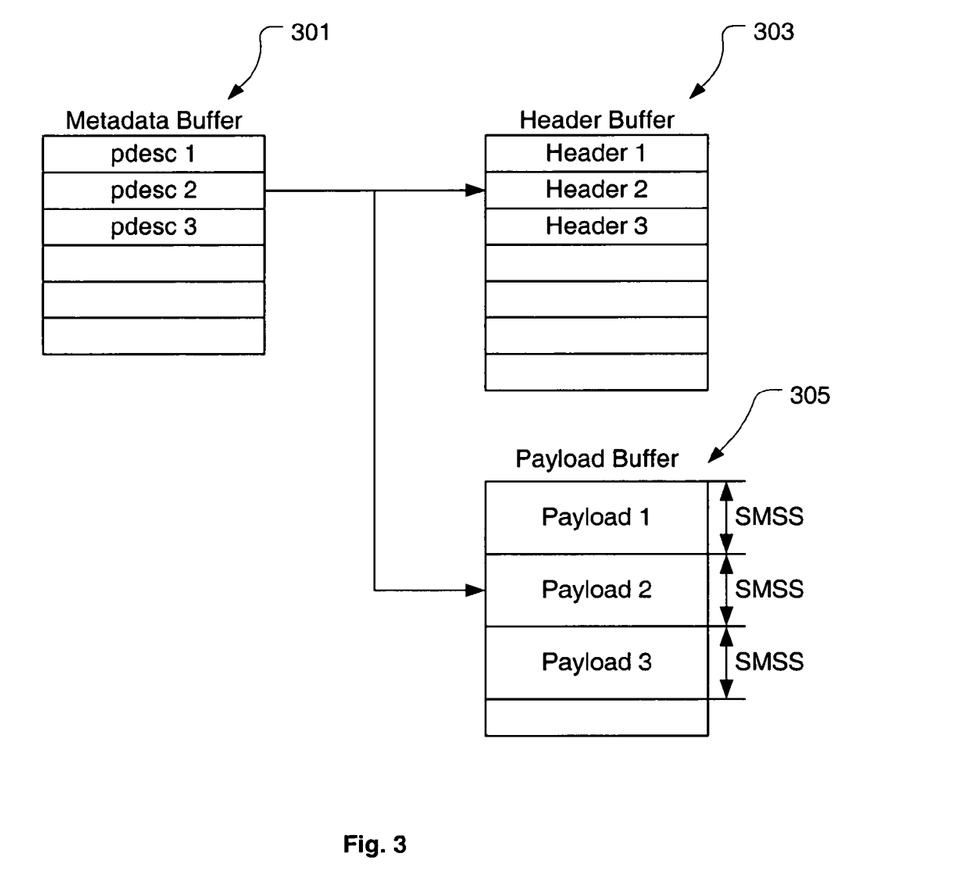
FIG. 3 is an illustration showing a conceptualization of multidata message content, in accordance with one embodiment of the present invention.

FIG. 3 is an illustration showing a conceptualization of multidata message content, in accordance with one embodiment of the present invention. The multidata message is defined by a metadata portion, a header portion, and a payload portion. The metadata portion resides in a metadata buffer 301. The metadata describes various properties of the packets represented by the multidata message, such as a packet count, a packet layout, and any optional attributes of the packets, e.g., source/destination address, checksum information, etc. The header and payload portions of the multidata message reside in a header buffer 303 and a payload buffer 305, respectively. The header buffer 303 and the payload buffer 305 represent physically separate buffers defined within the kernel memory 140.

With respect to the example of FIG. 3, the metadata buffer 301 includes packet descriptions for each of three packets (pdesc 1, pdesc 2, pdesc 3). The header buffer 303 includes header data for each of three packets (Header 1, Header 2, and Header 3). The payload buffer 305 includes payload data for each of three packets (Payload 1, Payload 2, and Payload 3). It should be appreciated that each of Payload 1, Payload 2, and Payload 3 can represent a number of packet fragments. Additionally, each of Payload 1, Payload 2, and Payload 3 is shown to be equal to the send maximum segment size (SMSS). Therefore, each of Payload 1, Payload 2, and Payload 3 is capable of being included in a respective packet. Arrows are drawn between pdesc 2, Header 2, and Payload 2 to illustration their association. For example, pdesc 2 includes information which identifies Header 2 as including the appropriate header data for Packet 2 and Payload 2 as including the appropriate payload data for Packet 2. A similar association between pdesc, Header, and Payload is established for Packets 1 and 3.

To define the payload data, the data generation module 210 can be defined to send large blocks of application data to the transport module 220. The transport module 220 then functions to packetized the application data into smaller chunks, where each chuck is at most one SMSS. The packetization process performed by the transport module 220 requires allocating the header buffer 303 with enough space to hold the header information for the maximum number of packets that can be defined in the payload buffer 305. The packetization process performed by the transport module 220 further includes filling the header buffer 303 with the appropriate transport and network header information. The transport module 220 in conjunction with the MDT 150 creates the multidata message associated with a pair of header and payload buffers, e.g., 303 and 305, including defining the packet descriptions 301. The multidata message represents the set of headers and associated payloads for a given payload buffer.

The multidata messages proceed from the transport module 220 to the network module 230 for further processing. It should be appreciated that each multidata message can represent multiple packets. At the network module 230, additional processing such as route lookups and checksumming can be performed. The network module 230 can also add attributes to the multidata message, such as physical destinations address/SAP and hardware checksumming information. From the network module 230, the multidata message proceeds to the device driver 240. The device driver 240 can perform further operations. For example, in one embodiment, the device driver 240 will perform two IOMMU operations (mapping and flushing/unmapping) for the entire number of packets represented by each multidata message.

The multidata transmission scheme as described thus far requires one header buffer and one payload buffer per multidata message. Therefore, the multidata transmission scheme described thus far does not support transmission of packets that span across more than one payload buffer, i.e., include virtual address (VA) disjoint blocks of payload data.

When sending a multidata message, the data generation module 210 either copies over the user data into kernel allocated memory, or borrows the data over from the virtual memory (VM) subsystem. In either case, a size of each data block passed to the transport module 220 from the data generation module 210 may vary, and each of the passed data blocks may be VA-disjointed from one another. The reverse is also true when receiving a multidata message in a system where the network interface card is capable of header-splitting and payload-reassembly. Reassembling the payload data involves handing off physically-contiguous pagesize buffers to the hardware to enable placement of the reassembled data stream. Once a buffer has been filled, the hardware uses subsequent host-supplied buffers to store additional data for the same connection.

A data stream is divided by the transport module 220 into units of segments prior to being passed to the network module 230, wherein each segment size may vary and begin at any offset within a data block. In particular, the size of a data block may not be fully divisible by the effective SMSS, thereby creating a case where a segment may lie across multiple data blocks, i.e., be split between VA-disjoint buffers. This phenomenon is evident in both sending and receiving scenarios of multidata message transmission.

Figure 4:
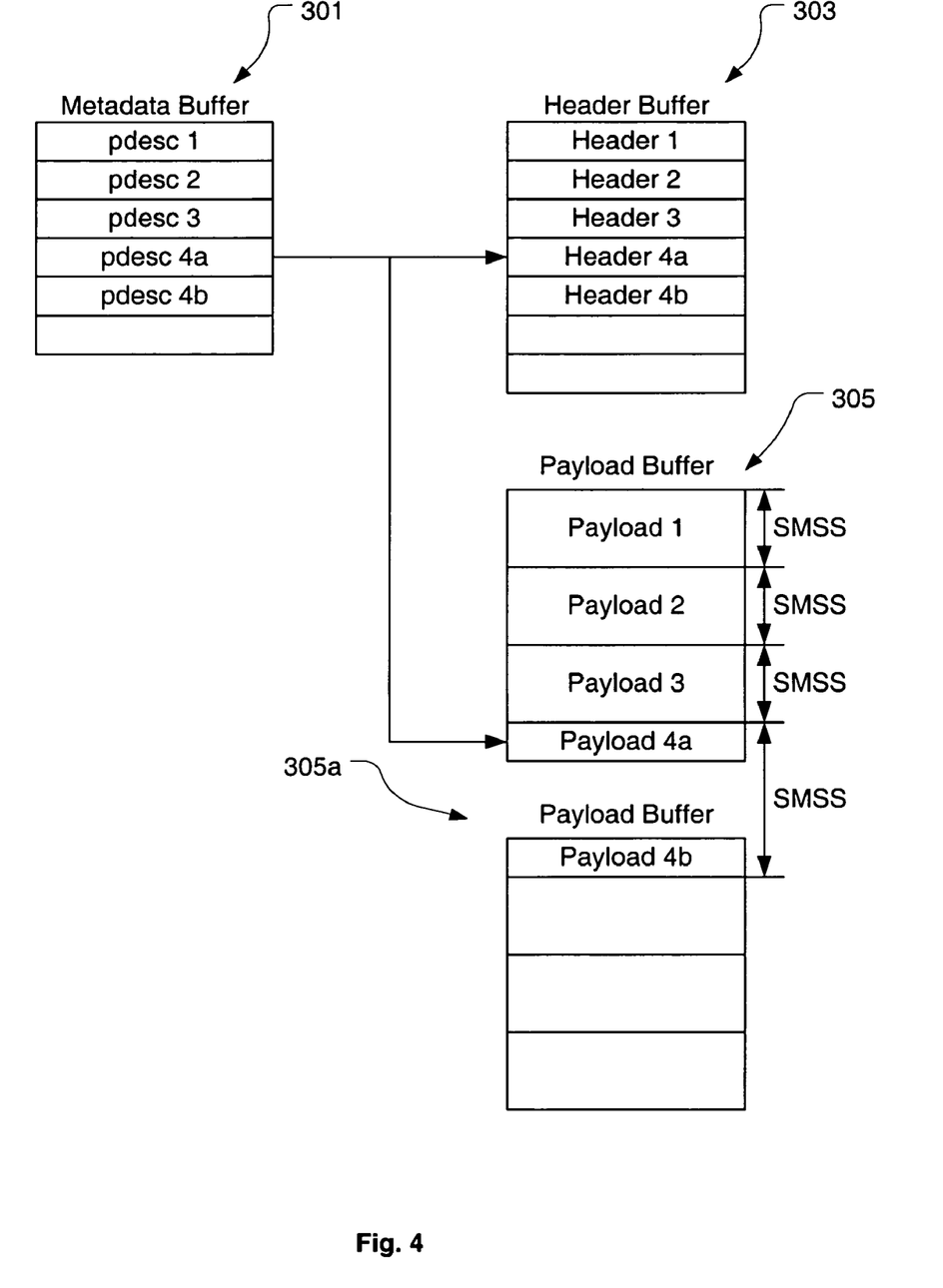
FIG. 4 is an illustration showing a split-packet scenario, wherein a data segment lies across multiple data blocks.

FIG. 4 is an illustration showing a split-packet scenario, wherein a data segment lies across multiple data blocks. As previously discussed with respect to FIG. 3, the metadata buffer 301, the header buffer 303, and the payload buffer 305 are provided to define the multidata message. Additionally, another payload buffer 305a is required to define the multidata message. The metadata buffer 301 includes information for five packets (pdesc 1, pdesc 2, pdesc 3, pdesc 4a, and pdesc 4b). The header buffer includes header data for five packets (Header 1, Header 2, Header 3, Header 4a, and Header 4b). The payload buffer 305 includes four data segments (Payload 1, Payload 2, Payload 3, and Payload 4a). It should be appreciated that the payload buffer 305 is not evenly divisible by SMSS. Therefore, the last data segment of payload buffer 305 has a size less than SMSS. Consequently, a remainder of the last SMSS-sized data segment, i.e., Payload 4b, must be placed in the payload buffer 305a.

Figure 5:
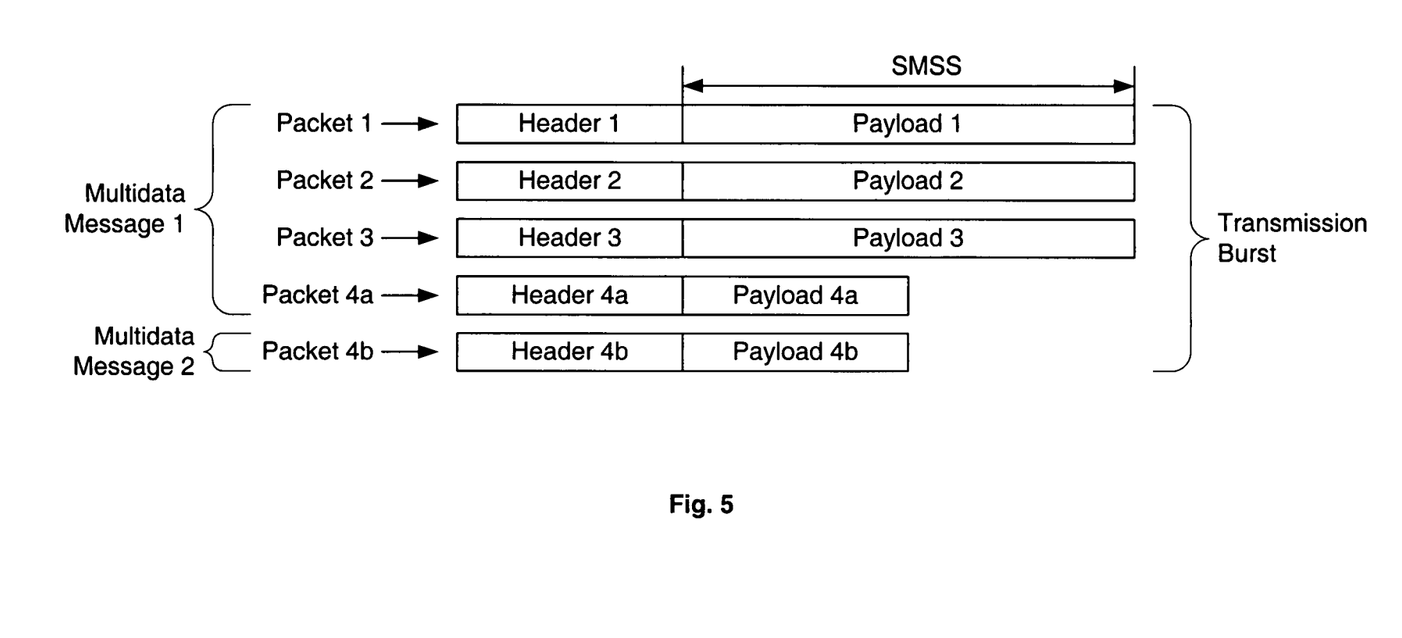
FIG. 5 is an illustration showing the two multidata messages required to send the data of FIG. 4.

Because the multidata framework, as described in Part 1 of the present description, can only be associated with one header buffer and one payload buffer, it is not possible to include all five of the data segments (Payload 1, Payload 2, Payload 3, Payload 4a, and Payload 4b) in a single multidata message. Therefore, it is necessary to send two multidata messages. FIG. 5 is an illustration showing the two multidata messages required to send the data of FIG. 4. The first multidata message includes packets 1, 2, 3, and 4a. The second multidata message includes packet 4b. It should be understood that the header and payload data for each of packets 1, 2, 3, 4a, and 4b are correlated by pdesc 1, 2, 3, 4a, and 4b, respectively, in the multidata.

As shown in FIGS. 4 and 5, the inability of the multidata framework, as described in Part 1 of the present description, to handle the split-packet scenario requires the transport module 220 to generate an additional multidata message. Generation of additional multidata messages when avoidable will result in sub-optimal network performance. For example, having partially-filled packet payload segments, i.e., less than SMSS, in the middle of a transmission burst increases the number of packets used to transfer a given amount of user data. The increase in the number of packets causes an increase in the number of incoming acknowledgements (ACKs) and associated processing, thus impacting network performance.

Part 2: Multidata Interface with Multiple Payload Buffer Association Capability

To address the inability of the multidata framework, as described in Part 1 of the present description, to handle the split-packet scenario, the present invention represents as extension of the multidata framework of Part 1 to allow for more than one payload buffer association per multidata message. In the multidata framework of Part 1, payload buffer association is made at the time of multidata buffer allocation, i.e., metadata buffer allocation, header buffer allocation, and payload buffer allocation, and is limited to one payload buffer per multidata message. Additionally, in the multidata framework of Part 1, once the multidata buffers are allocated, no further buffer associations can be made with the multidata.

In the multidata framework of the present invention, a number of payload buffers (up to a maximum allowable number) are associated with the multidata following allocation of the multidata buffers. Thus, upon creation of the multidata, only the metadata buffer and the header buffer are allocated, with the associated payload buffers being allocated/associated later as needed. For simplicity, the number of payload buffer associations in a given multidata message can be limited. A maximum number of allowable payload buffer associations in a given multidata message can be set to any suitable value. In one embodiment, the maximum number of allowable payload buffer associations in a given multidata message is set to 16. Additionally, multidata buffer allocation is non-reversible. Therefore, when a payload buffer is associated with a multidata, the payload buffer cannot be subsequently disassociated until the multidata itself is released.

In order to identify one payload buffer from another in a multidata message having multiple associated payload buffers, each associated payload buffer is assigned an index. Assignment of the payload buffer index is done when the payload buffer is associated with the multidata message. The payload buffer index is used by the multidata packet descriptors to provide a mapping between a packet payload extent and a payload buffer. The payload buffer index also serves as an index into a multidata payload buffer description array.

The concept of associating multiple payload buffers with a multidata message can be summarized as follows:
  A multidata gets allocated with no payload buffer association. The multidata can later be associated with one or more payload buffers.
  Each associated payload buffer is assigned an index for identification purposes.
  The metadata buffer and header buffer allocation is the same as in the multidata framework description in Part 1 of the present description. Thus, there can be at most one header buffer allocation per multidata. The header buffer must be allocated and associated with the multidata at the time of multidata allocation.

In the multidata framework of the present invention, the multidata description includes the following parameters:
  header buffer start address
  header buffer end address
  number of associated payload buffers
  start address of each associated payload buffer
  end address of each associated payload buffer.

Figure 6:
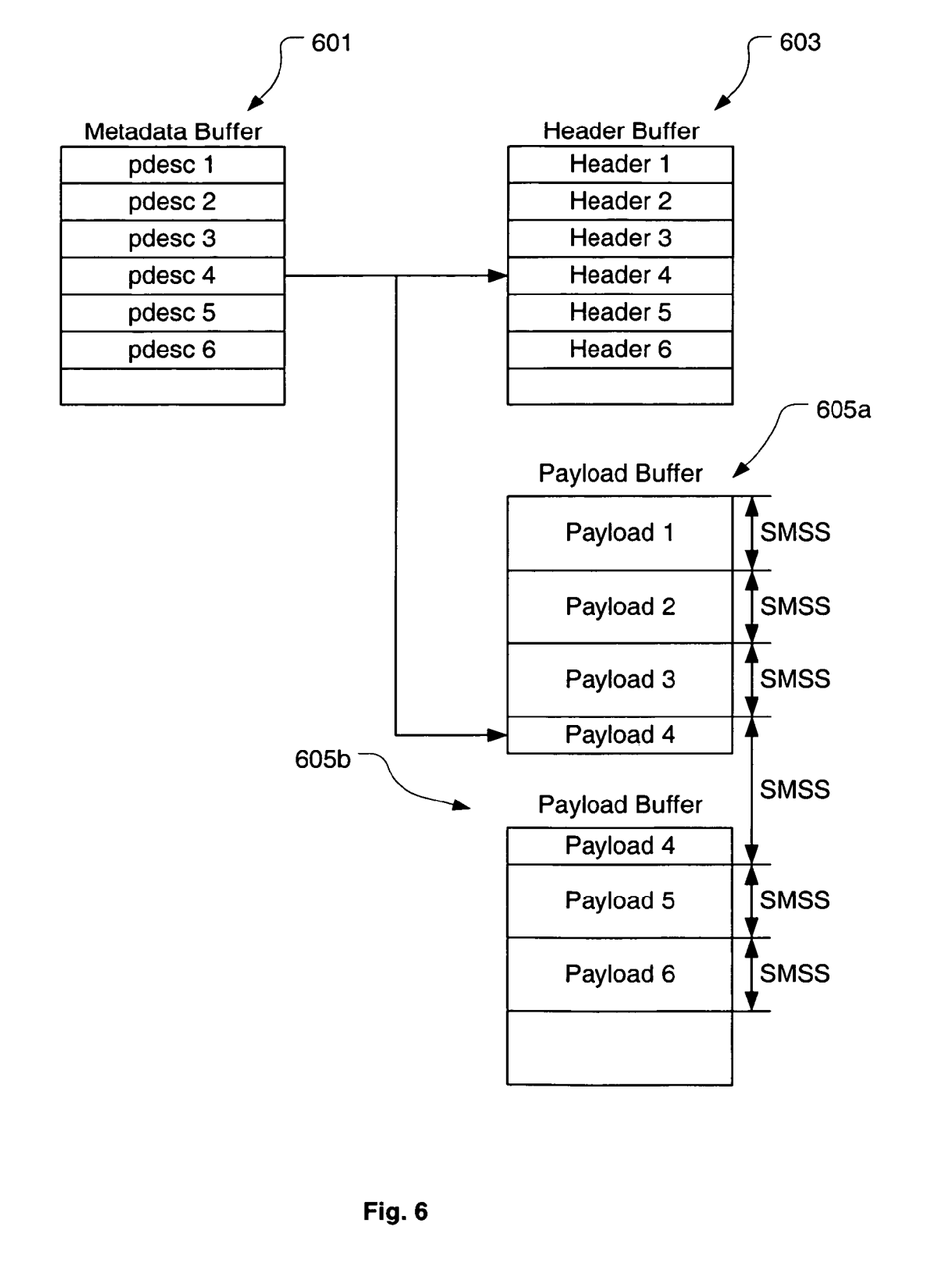
FIG. 6 is an illustration showing a split-packet being considered as a single packet, in accordance with one embodiment of the present invention.

Because the multidata framework of the present invention allows a packet's payload to span across multiple payload buffers, the split-packet scenario can be resolved by allowing the split-packet to be considered as a single packet. FIG. 6 is an illustration showing a split-packet being considered as a single packet, in accordance with one embodiment of the present invention. In FIG. 6, a metadata buffer 601 and a header buffer 603 are associated with the multidata at the time of multidata allocation. The metadata buffer 601 includes packet descriptors for each packet in the multidata message, i.e., pdesc 1 through pdesc 6. Payload buffers 605a and 605b are allocated and associated with the multidata, as required during development of the multidata message. For example, when the first packet is defined, payload buffer 605a is allocated/associated. When the fourth packet is defined, payload buffer 605b is allocated/associated.

As shown in FIG. 6, each packets 1-3 and 5-6 have payloads associated with one payload buffer. However, payload 4 represents a split-packet that is associated with two payload buffers. For discussion purposes, each contiguous portion of a packet payload that resides in a given payload buffer is referred to as a payload span. Thus, payload 4 includes two payload spans, one in payload buffer 605a and one in payload buffer 605b. To accommodate the payload span capability, a description of the multidata packets of the present invention include the following parameters:
  start address of header entry in header buffer
  end address of header entry in header buffer
  number of payload spans in packet
  for each payload span in packet:
  payload buffer index
  start address of payload span in payload buffer corresponding to index
  end address of payload span in payload buffer corresponding to index.

In accordance with the foregoing, each payload span maps to a specific region of a payload buffer, wherein the payload buffer is identified by the index value of the payload buffer. The multidata framework of the present invention does not impose any restrictions on how the multidata user describes the payload spans that define a packet, except that the memory regions represented by the payload spans must fall within the VA boundaries of the payload buffers. Therefore, the payload spans may overlap one another, be empty (zero length), refer to the same payload buffer, and/or refer to different buffers in non-consecutive order. In one embodiment, the number of allowable payload spans per packet is limited to the number of payload buffers allowed. This embodiment allows for a packet to have payload spans in each of the payload buffers.

Figure 7:
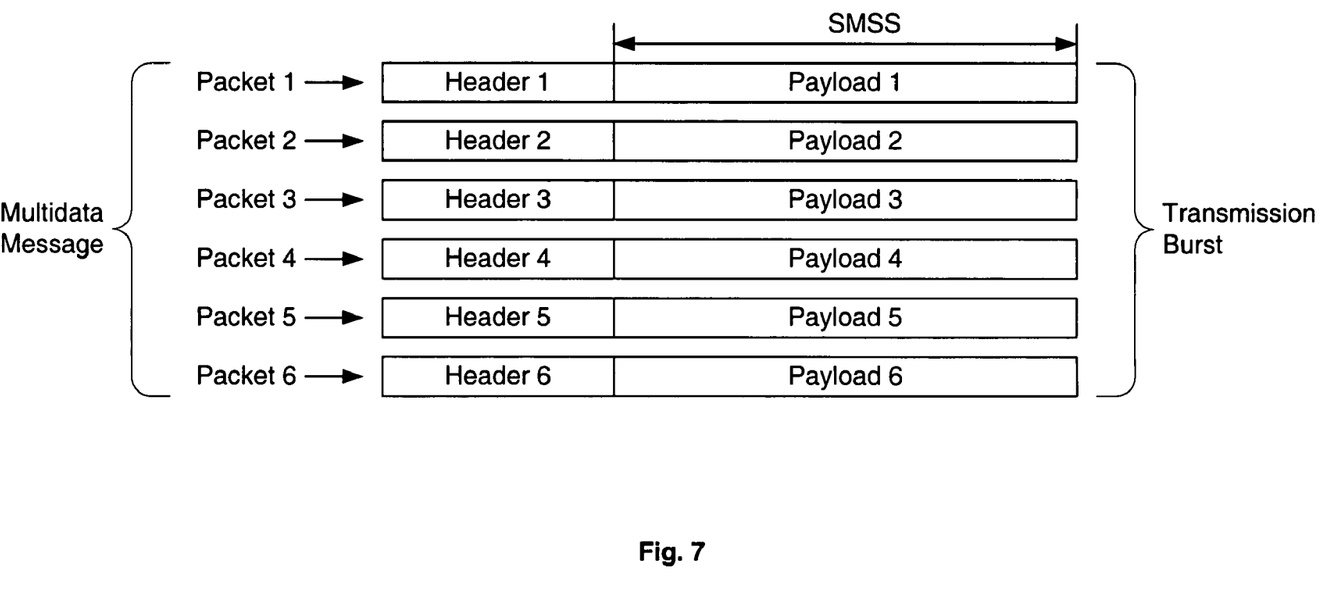
FIG. 7 is an illustration demonstrating a transmission burst associated with the multidata of FIG. 6, in accordance with one embodiment of the present invention.

The association of multiple payload buffers with a given multidata message, as described with respect to FIG. 6, allows for transmission of data in full SMSS segments. FIG. 7 is an illustration demonstrating a transmission burst associated with the multidata of FIG. 6, in accordance with one embodiment of the present invention. As shown in FIG. 7, each of packets 1-6 is defined by a payload of SMSS. In particular, payload 4 which was split as two payload spans between payload buffers 605a and 605b is defined together in packet 4, thus avoiding a need to provide two packets for transmission of one SMSS of data, as previously illustrated in FIG. 5. Additionally, it should be appreciated that allowance for multiple payload buffer associations with a given multidata message, enables a single multidata message to transmit an amount of data that exceeds a capacity of an individual payload buffer. Therefore, association of multiple payload buffers with a given multidata message enables a given amount of data to be transmitted using a reduced number of multidata messages.

Figure 8:
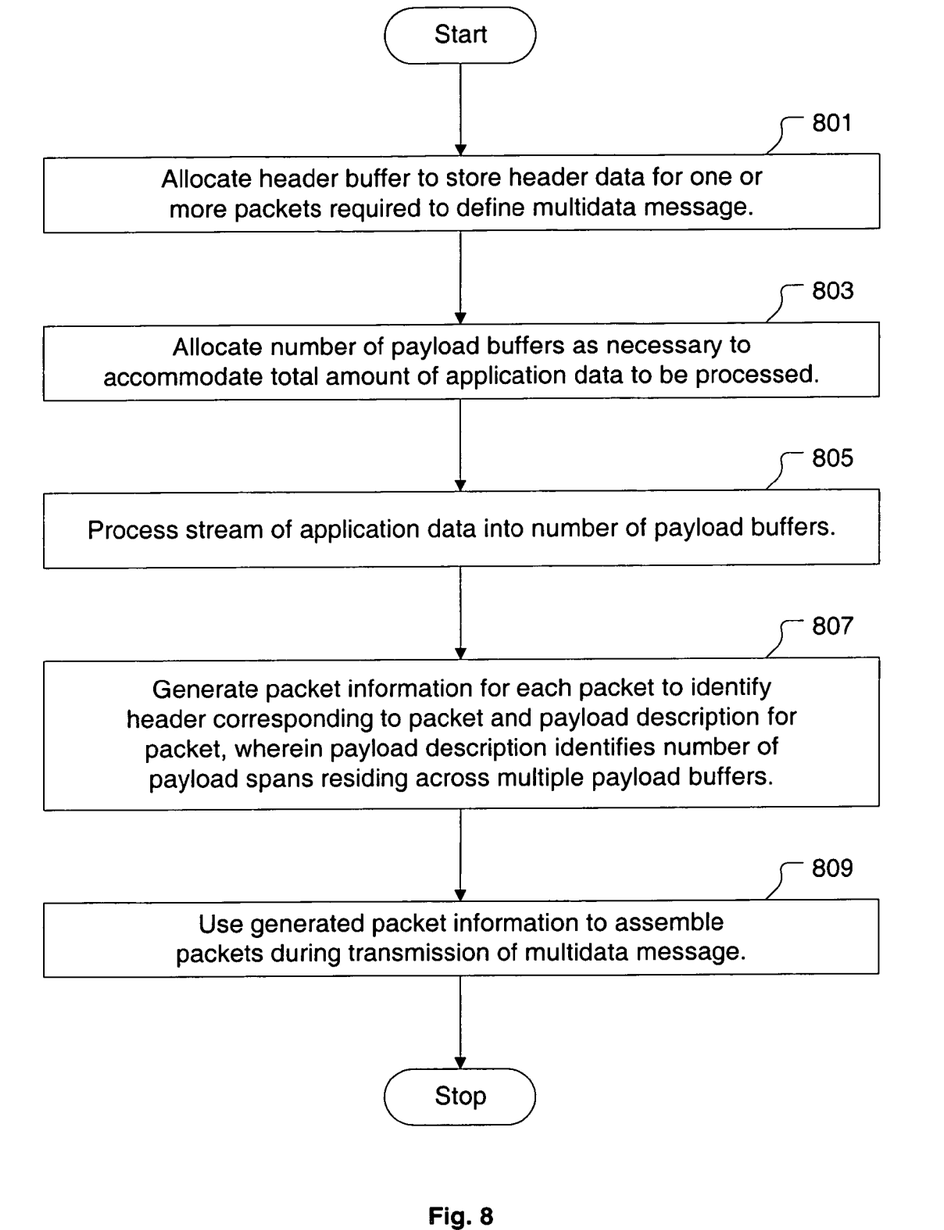
FIG. 8 is an illustration showing a flowchart of a method for generating a multidata message for transmission from a computer operating kernel to a network device driver, in accordance with one embodiment of the present invention.

FIG. 8 is an illustration showing a flowchart of a method for generating a multidata message for transmission from a computer operating kernel to a network device driver, in accordance with one embodiment of the present invention. The method includes an operation 801 for allocating a header buffer to store header data for one or more packets required to define the multidata message. The method also includes an operation 803 for allocating a number of payload buffers of variable size, as necessary to accommodate a total amount of application data to be processed. It should be appreciated that the payload buffers can be allocated at disjoint virtual address locations in memory. Additionally, it should be appreciated that the size of each of the payload buffers is not required to be evenly divisible by SMSS. Furthermore, each of the payload buffers is allocated after allocation of the header buffer, rather than simultaneously with the allocation of the header buffer.

The method further includes an operation 805 for processing a stream of application data into the number of payload buffers. In one embodiment, the stream of application data is processed into the number of payload buffers in a sequential manner, such that each payload buffer is filled with application data prior to placing application data in a subsequent payload buffer. The method also includes an operation 807 for generating packet information for each of the one or more packets. The generated packet information for each of the one or more packets can be stored in a metadata buffer. The packet information identifies a header in the header buffer corresponding to the packet and a payload description for the packet. The payload description identifies a number of payload spans, wherein the number of payload spans reside in multiple payload buffers.

In one embodiment, a unique identifying index is associated with each of the payload buffers. The unique identifying index can be used to associate a particular payload span with the payload buffer within which the particular payload span resides. The method provides for generation of packet information such that each packet in the multidata message, other than a final packet in the multidata message, is defined to have a payload equal to SMSS. Thus, payload space does not go unused in the packets constituting the multidata message. The method further includes an operation 809 for using the generated packet information to assemble each of the one or more packets during transmission of the multidata message.

In view of the foregoing, it should be appreciated that the computer system of FIG. 1 and the kernel network subsystem of FIG. 2 can be defined to represent a multidata communication system capable of implementing the multidata framework as described in Part 2 of the present description. More specifically, the multidata transmission module 150 and transport module 220 together represent means for allocating a header buffer to store header data for one or more packets required to define a multidata message. The multidata transmission module 150 and transport module 220 together also represent means for allocating a number of payload buffers of variable size, as necessary to accommodate a total amount of application data to be processed. It should be appreciated that the payload buffers can be allocated at disjoint virtual address locations in memory. The multidata transmission module 150 and the data generation module 210 represent means for processing a stream of application data into the number of payload buffers. Additionally, the multidata transmission module 150 and the transport module 220 together represent means for generating packet information for each of the one or more packets. The packet information is defined to identify a header in the header buffer corresponding to the packet and a payload description for the packet. The payload description is defined to identify a number of payload spans, wherein the number of payload spans may reside in multiple payload buffers. The multidata transmission module 150, transport module 220, and network module 230 represent means for using the generated packet information to assemble each of the one or more packets during transmission of the multidata message via the device driver 240.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the present invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

Embodiments of the present invention can be processed on a single computer, or using multiple computers or computer components which are interconnected. A computer, as used herein, shall include a standalone computer system having its own processor, its own memory, and its own storage, or a distributed computing system, which provides computer resources to a networked terminal. In some distributed computing systems, users of a computer system may actually be accessing component parts that are shared among a number of users. The users can therefore access a virtual computer over a network, which will appear to the user as a single computer customized and dedicated for a single user.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for generating a multidata message for transmission from a computer operating kernel to a network device driver, comprising:

allocating a header buffer to store header data for one or more packets required to define the multidata message;

allocating a number of payload buffers as necessary to accommodate application data to be processed;

processing the application data into the number of payload buffers;

generating packet information for each of the one or more packets, the packet information identifying a header in the header buffer corresponding to the packet and a payload description for the packet, the payload description identifying a number of payload spans, wherein each of the number of payload spans represents a contiguous portion of application data within any of the number of payload buffers, and wherein any of the number of payload spans can extend across a plurality of the number of payload buffers; and using the generated packet information to assemble each of the one or more packets during a transmission of the multidata message.

2. The method as recited in claim 1, wherein the number of payload buffers are allocated at disjoint virtual address locations in memory.

3. The method as recited in claim 1, wherein each of the number of payload buffers is allocated after allocation of the header buffer.

4. The method as recited in claim 1, further comprising:
storing the generated packet information for each of the one or more packets in a metadata buffer.

5. The method as recited in claim 1, further comprising:
associating a unique identifying index with each of the number of payload buffers.

6. The method as recited in claim 5, further comprising:
using the unique identifying index to associate a particular payload span portion with a particular payload buffer within which the particular payload span portion resides.

7. The method as recited in claim 1, wherein a size of each of the number of payload buffers is not evenly divisible by a send maximum segment size (SMSS).

8. A computer readable medium including program instructions for generating a multidata message for transmission from a computer operating kernel to a network device driver, comprising:
program instructions for allocating a header buffer to store header data for one or more packets required to define the multidata message;
program instructions for allocating a number of payload buffers as necessary to accommodate application data to be processed;
program instructions for processing the application data into the number of payload buffers;
program instructions for generating packet information for each of the one or more packets, the packet information identifying a header in the header buffer corresponding to the packet and a payload description for the packet, the payload description identifying a number of payload spans, wherein each of the number of payload spans represents a contiguous portion of application data within any of the number of payload buffers, and wherein any of the number of payload spans can extend across a plurality of the number of payload buffers; and
program instructions for using the generated packet information to assemble each of the one or more packets during a transmission of the multidata message.

9. The computer readable medium as recited in claim 8, wherein the number of payload buffers are allocated at disjoint virtual address locations in memory.

10. The computer readable medium as recited in claim 8, wherein each of the number of payload buffers is allocated after allocation of the header buffer.

11. The computer readable medium as recited in claim 8, further comprising:
program instructions for storing the generated packet information for each of the one or more packets in a metadata buffer.

12. The computer readable medium as recited in claim 8, further comprising:
program instructions for associating a unique identifying index with each of the number of payload buffers.

13. The computer readable medium as recited in claim 12, further comprising:
program instructions for using the unique identifying index to associate a particular payload span portion with a particular payload buffer within which the particular payload span portion resides.

14. The computer readable medium as recited in claim 8, wherein a size of each of the number of payload buffers is not evenly divisible by a send maximum segment size (SMSS).

15. A computer system, comprising:
a memory;
a processor defined to communicate with the memory;
a network interface device defined to communicate with the memory and the processor; and
kernel memory allocated within the memory, the kernel memory including data defining a multidata transmission module, the multidata transmission module including logic to direct generation and transmission of a multidata message through the network interface device, wherein the multidata message is associated with multiple payload buffers, wherein the multidata transmission module is defined to generate packet information including a payload description for a packet, the payload description identifying a number of payload spans, wherein each of the number of payload spans represents a contiguous portion of application data within any of the number of payload buffers, and wherein any of the number of payload spans can extend across multiple payload buffers.

16. The computer system as recited in claim 15, wherein the multiple payload buffers reside at disjoint virtual address locations in memory.

17. The computer system as recited in claim 15, wherein the multidata message is defined by one or more packets, the multidata transmission module enabling transmission of the multidata message defined by the one or more packets in a single transmission cycle, each of the one or more packets including a header portion and a payload portion, the header portion being obtained from a single header buffer, the payload portion being obtained from a plurality of the multiple payload buffers.

18. The computer system as recited in claim 17, wherein the multidata transmission module includes logic for generating packet descriptive information for each of the one or more packets defining the multidata message, the packet descriptive information including header address information and payload address information.

19. The computer system as recited in claim 18, wherein a payload portion for each of the one or more packets is defined by a number of payload spans, wherein each of the number of payload spans represents a contiguous portion of application data within any one of the multiple payload buffers, and wherein the number of payload spans reside in a plurality of the multiple payload buffers, the payload address information including address information for each of the number of payload spans.

20. The computer system as recited in claim 19, wherein the multidata transmission module includes logic for assigning an index to each of the multiple payload buffers, the index enabling correlation of each of the number of payload spans to an appropriate one of the multiple payload buffers when generating the packet descriptive information.

* * * * *